(12) United States Patent
Lacaux et al.

(10) Patent No.: US 11,509,245 B2
(45) Date of Patent: Nov. 22, 2022

(54) ELECTRICAL ARCHITECTURE FOR AN AIRCRAFT, AIRCRAFT COMPRISING THE ARCHITECTURE AND METHOD FOR OPERATING THE ARCHITECTURE

(71) Applicant: THALES, Courbevoie (FR)

(72) Inventors: Frédéric Lacaux, Chatou (FR); Stéphane Guguen, Chatou (FR); Amira Maalouf, Chatou (FR)

(73) Assignee: THALES, Courbevoie (FR)

( * ) Notice: Subject to any disclaimer, the term of this patent is extended or adjusted under 35 U.S.C. 154(b) by 737 days.

(21) Appl. No.: 16/447,722

(22) Filed: Jun. 20, 2019

(65) Prior Publication Data

US 2019/0393809 A1    Dec. 26, 2019

(30) Foreign Application Priority Data

Jun. 22, 2018 (FR) .................................... 1800653

(51) Int. Cl.
| | |
|---|---|
| *H02P 3/06* | (2006.01) |
| *H02P 3/04* | (2006.01) |
| *B64D 13/06* | (2006.01) |
| *F02C 7/275* | (2006.01) |
| *H02K 49/00* | (2006.01) |

(52) U.S. Cl.
CPC ................ *H02P 3/06* (2013.01); *B64D 13/06* (2013.01); *F02C 7/275* (2013.01); *H02K 49/00* (2013.01); *H02P 3/04* (2013.01); *B64D 2013/0644* (2013.01)

(58) Field of Classification Search
CPC ... H02P 3/06; H02P 3/04; B64D 13/06; F02C 7/275; H02K 49/00
USPC .......................................................... 318/362
See application file for complete search history.

(56) References Cited

U.S. PATENT DOCUMENTS

| | | | |
|---|---|---|---|
| 2006/0043922 A1 | 3/2006 | Baker et al. | |
| 2007/0262644 A1 | 11/2007 | Foch et al. | |
| 2007/0284480 A1 | 12/2007 | Atkey et al. | |
| 2008/0111420 A1* | 5/2008 | Anghel .................... | H02J 4/00 307/11 |
| 2010/0026089 A1 | 2/2010 | Anghel et al. | |
| 2013/0229053 A1 | 9/2013 | Rambaud et al. | |
| 2016/0039371 A1* | 2/2016 | Blumer ................... | B60L 50/10 290/31 |
| 2019/0181786 A1* | 6/2019 | Singh ....................... | H02P 9/08 |

FOREIGN PATENT DOCUMENTS

| | | | | |
|---|---|---|---|---|
| EP | 3 190 282 A1 | 7/2017 | | |
| WO | WO-9900596 A1 * | 1/1999 | ............. | F02N 11/04 |
| WO | 2010/067021 A1 | 6/2010 | | |
| WO | 2018/024983 A1 | 2/2018 | | |
| WO | WO-2018024983 A1 * | 2/2018 | ............. | B64D 13/00 |

* cited by examiner

*Primary Examiner* — Kawing Chan
(74) *Attorney, Agent, or Firm* — BakerHostetler

(57) ABSTRACT

An architecture for an aircraft comprises two air-conditioning systems, two converters, each intended to supply one of the air-conditioning systems, and at least one first electric machine which starts up a first main engine of the aircraft. The electrical architecture is configured such that the two converters can together supply the first electric machine. A method of operating the architecture is also provided.

10 Claims, 6 Drawing Sheets

ELECTRICAL ARCHITECTURE FOR AN AIRCRAFT, AIRCRAFT COMPRISING THE ARCHITECTURE AND METHOD FOR OPERATING THE ARCHITECTURE

CROSS-REFERENCE TO RELATED APPLICATIONS

This application claims priority to foreign French patent application No. FR 1800653, filed on Jun. 22, 2018, the disclosure of which is incorporated by reference in its entirety.

FIELD OF THE INVENTION

The invention relates to an architecture for an aircraft, to an aircraft comprising the architecture and to a method for operating the architecture.

BACKGROUND

In the field of aeronautics, the current trend is to increase the amount of electrical equipment and thus the on-board electrical power. An aeroplane generally comprises a large number of electrical loads that are supplied with electrical power by an on-board electrical supply network, for example the air-conditioning systems and the electric machines which serve to start up the main engines of the aeroplane. These loads principally implement polyphase alternating electric machines. The electrical energy supplied to these machines comes from power converters connected to an on-board network which provides electrical energy in the form of direct or alternating current. The on-board network may for example comprise electric generators, storage batteries, or even means for connecting to an electrical supply network which is external to the aeroplane and which permits a supply of electricity to the aeroplane when it is parked at an airport. Aeroplanes often contain 540 V DC networks and/or 115 V or 230 V, 400 Hz AC networks.

The on-board equipment is very varied, and its energy consumption varies greatly over time. By way of example, the air-conditioning systems are in near-constant operation while electric machines that serve to start up the main engines are in operation only prior to takeoff and for a very short time.

The power converters receive energy from the on-board network to convert it into polyphase alternating energy that matches the power and frequency requirements of the load. This matching between the converters and the loads often entails the implementation of dedicated converters for the loads.

Efforts have been made to mutualize the converters when the associated loads do not operate simultaneously. However, the air-conditioning systems must always be operational and, a priori, it does not appear possible to interrupt the operation of these systems, using the associated converters for other loads. Moreover, in order to mutualize a converter, it is preferable for the various loads that can be supplied by this converter to consume similar powers. Indeed, when multiple loads are associated with a single converter, it is necessary to design the converter in dependence on the most power-hungry load.

SUMMARY OF THE INVENTION

The invention has the aim of mutualizing converters so as to use them for dissimilar loads, in particular the air-conditioning system and the electric machines that serve for starting up the main engines. The invention may be implemented in any type of aircraft having multiple converters.

To that end, the invention relates to an electrical architecture for an aircraft comprising two air-conditioning systems, two converters, each intended to supply one of the air-conditioning systems, and at least one first electric machine which starts up a first main engine of the aircraft. According to the invention, the electrical architecture is configured such that the two converters can together supply the first electric machine.

Advantageously, each of the two converters comprises at least two inverters; the architecture further comprises a coupler which serves to link at least two first of the inverters; the electric machine comprises a main winding that can be supplied by the coupler and an exciter winding that can be supplied by a second one of the inverters.

Advantageously, below a predetermined altitude the two converters are configured to supply just one of the two air-conditioning systems.

Advantageously, an inverter of each converter may supply an air recirculation fan.

Advantageously, an inverter of at least one of the converters may supply an electric motor for powering a wheel of the aircraft.

The electrical architecture may comprise a second electric machine that starts up a second main engine of the aircraft. Advantageously, the electrical architecture is configured such that the two converters can together supply the first electric machine or the second electric machine.

Advantageously, the architecture comprises a first driver module associated with a first one of the two converters, a second driver module associated with a second one of the two converters and a bus that allows the first and second driver modules to communicate; the architecture is then configured so as to make the first converter and the first driver module masters during combined supply of the first electric machine, the second converter and the second driver module being slaves; the architecture is configured so as to make the second converter and the second driver module masters during combined supply of the second electric machine, the first converter and the first driver module being slaves.

Advantageously, the architecture comprises an auxiliary power unit and an electric machine for starting up the auxiliary power unit; the electrical architecture is then configured such that the two converters can supply the electric machine for starting up the auxiliary power unit.

Advantageously, the architecture comprises at least one battery for storing electrical energy; the electric machine for starting up the auxiliary power unit is then supplied by the battery via the converters.

The invention also relates to an aircraft comprising an electrical architecture according to the invention.

The invention also relates to a method for operating an electrical architecture according to the invention, in which the first and second electric machines are configured so as to permit operation as a motor or as a generator, making it possible to supply the two converters, the method being characterized in that it consists in supplying the first electric machine operating as a motor so as to start up the first main engine until the first electric machine operates as a generator, receiving mechanical energy from the first main engine, the first electric machine then supplying the two converters, in that the method then consists in supplying the second electric machine operating as a motor in order to start up the second main engine.

Advantageously, the electric machine for starting up the auxiliary power unit is configured so as to permit operation as a motor or as a generator, making it possible to supply the two converters, and the method consists in supplying the electric machine for starting up the auxiliary power unit operating as a motor in order to start up the auxiliary power unit from the battery until the electric machine for starting up the auxiliary power unit, receiving mechanical energy from the auxiliary power unit, operates as a generator to supply the two converters; the method then consists in supplying the first electric machine operating as a motor in order to start up the first main engine.

Advantageously, the method consists in supplying the electric motor for powering a wheel of the aircraft once the auxiliary power unit has been started up and before starting up of the first main engine by the first electric machine.

BRIEF DESCRIPTION OF THE DRAWING

The invention will be better understood and further advantages will become apparent upon reading the detailed description of one embodiment provided by way of example, which description is illustrated by the attached drawing, in which.

For the sake of clarity, the same elements will bear the same references in the various figures.

DETAILED DESCRIPTION

Figure 1:
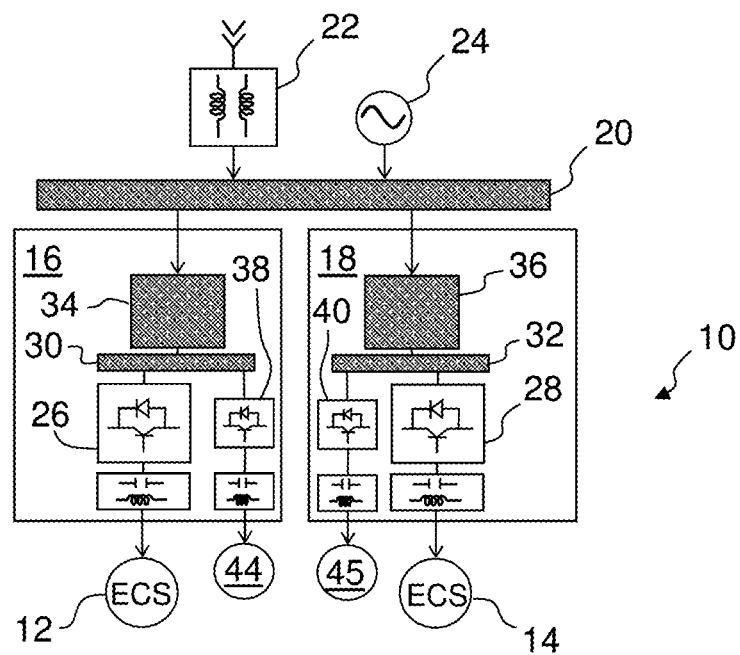
FIGS. 1 and 2 show a first embodiment of an electrical architecture of an aircraft.

FIG. 1 shows an exemplary electrical architecture 10 of an aeroplane comprising two air-conditioning systems 12 and 14. These systems are also referred to as ECS (environment control system). These two systems serve to regulate the temperature of the air in the cabin of the aeroplane. The architecture also comprises two converters 16 and 18, each intended to supply one of the air-conditioning systems, respectively 12 and 14. The two converters 16 and 18 are supplied by an alternating bus 20. Conventionally, on board large aeroplanes are conventionally 115 V, 400 Hz buses and more recently 230 V, 400 Hz buses. These buses are often called HVAC (high-voltage alternating current) buses. When the aeroplane is on the ground in an airport, the HVAC bus can be supplied by a ground power unit external to the aeroplane. The architecture 10 may comprise a transformer or autotransformer 22 which serves to match the voltage provided by the ground power unit to the voltage of the HVAC bus. In flight, the HVAC bus may be supplied by the main generators of the aeroplane. A generator 24 is shown in FIG. 1. These generators are generally electric machines linked to the main engines of the aeroplane. The HVAC bus may also be supplied by an auxiliary power unit (or APU). The APU uses the fuel of the aeroplane and is frequently used on the ground, in particular when the airport does not have a ground power unit, or in flight prior to landing so as to avoid any interruption to the electrical supply when the main generators are shut off.

Each of the converters 16 and 18 serves to match the voltage and frequency of the HVAC bus to the air-conditioning systems 12 and 14. More generally, the converters 16 and 18 serve to take power from an on-board network in order to supply the air-conditioning systems 12 and 14. The on-board network may be an AC network, as in the example shown, or a DC network.

Each one of the converters 16 and 18 comprises at least one inverter which serves for supplying the associated air-conditioning system. In the example shown, the converter 16 comprises an inverter 26 and the converter 18 comprises an inverter 28. Conventionally, the inverters 26 and 28 are three-phase inverters. The invention may be used regardless of the number of phases. Each one of the inverters 26 and 28 receives energy from a DC bus which is referred to as an HVDC (high-voltage direct current) bus, respectively 30 and 32. 270 V DC or 540 V DC buses are frequently found on board aircraft. Other DC voltages may of course be employed within the context of the invention. Each converter 16 and 18 may comprise a rectifier, respectively 34 and 36, which receives energy from the HVAC bus 20 and supplies the respective HVDC bus 30 or 32. Each converter may comprise filtering elements, in particular at the output of the inverters 26 and 28 and/or at the input of the rectifiers 34 and 36.

Each converter 16 and 18 may comprise a second inverter, respectively 38 and 40, which are supplied by the HVDC bus of its converter and which serve to supply other loads of the aircraft. The two inverters of a given converter may be of different dimensions. In the example shown, in FIG. 1, for the converter 16, the inverter 26 may deliver a power greater than that delivered by the inverter 38. Similarly for the converter 18, the inverter 28 may deliver a power greater than that delivered by the inverter 40. The various inverters may be unidirectional, making it possible to supply the loads of the aeroplane. The inverters may be bidirectional, for example if the loads are likely to generate power in turn. In particular, a bidirectional inverter may be used to connect a battery or a load which is capable of generating electrical energy at times.

The invention is not restricted to two inverters per converter. Depending on requirements, there may be more than two inverters in each one of the converters 16 and 18.

The converters 16 and 18 may be used to other ends, in particular to start up the main engines of the aeroplane. For example, when the aeroplane has two main engines, each of these is assigned an electric machine which operates as a motor and which serves to start up the engine. The electric machine may be reversible. In other words, it may also operate as a generator when the associated engine is in operation, such as the generator 24 shown in FIG. 1.

Figure 2:
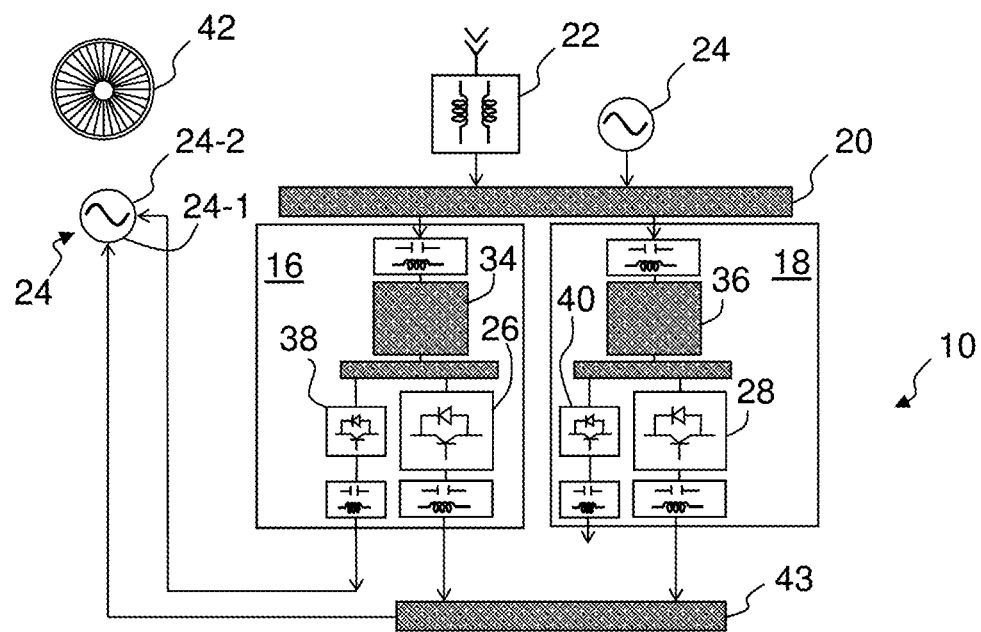

In FIG. 2, the electric machine 24 is shown in its motor mode for starting up one of the main engines 42 of the aeroplane. According to the invention, the two converters 16 and 18 together supply the electric machine 24. Indeed, the converters 16 and 18 are dimensioned to each supply one of the air-conditioning systems. To supply an electric machine serving to start up a main engine of the aeroplane, the two converters 16 and 18 are used in tandem such that these converters need not be oversized, which would be the case if only one had to be able to supply the electric machine 24.

The aeroplane generally comprises several main engines, in general two or four for large aeroplanes. The engines can be started up sequentially. More precisely, the converters 16 and 18 supply a first electric machine 24 assigned to a first main engine using energy from the APU or a battery of the aeroplane. Once the first engine has been started up, its associated electric machine can generate current to supply the HVAC bus. Only then are the converters 16 and 18 disconnected from the electric machine 24 of the first main engine to be connected to another electric machine assigned to a second main engine of the aeroplane, and so on until all of the engines of the aeroplane have been started up. During this phase of starting up the engines, the air-conditioning systems 12 and 14 are not supplied. The thermal inertia of the cabin makes this short-lived supply interruption, which remains of the order of a minute, acceptable.

The electric machine 24 may comprise two separate windings: a main winding 24-1 and an exciter winding 24-2. The main winding 24-1 requires much more power than the exciter winding 24-2. In the example shown, the two inverters 26 and 28 are coupled so as to supply the main winding 24-1. The exciter winding 24-2, for its part, requires only the power delivered by the inverter 38. The coupling of the two inverters 26 and 28 may be provided by a magnetic coupler 43.

The electrical architecture 10 comprises controlled contactors which are not shown and which serve to pass from the operating mode of FIG. 1 to that of FIG. 2.

In the operating mode of FIG. 1, only the inverters 26 and 28 are used to supply the air-conditioning systems 12 and 14. The inverters 38 and 40 may be used to supply other loads of the aircraft, such as air recirculation fans 44 and 45. While starting up the main engines, the fans 44 and 45 will temporarily not be supplied.

Figure 3:
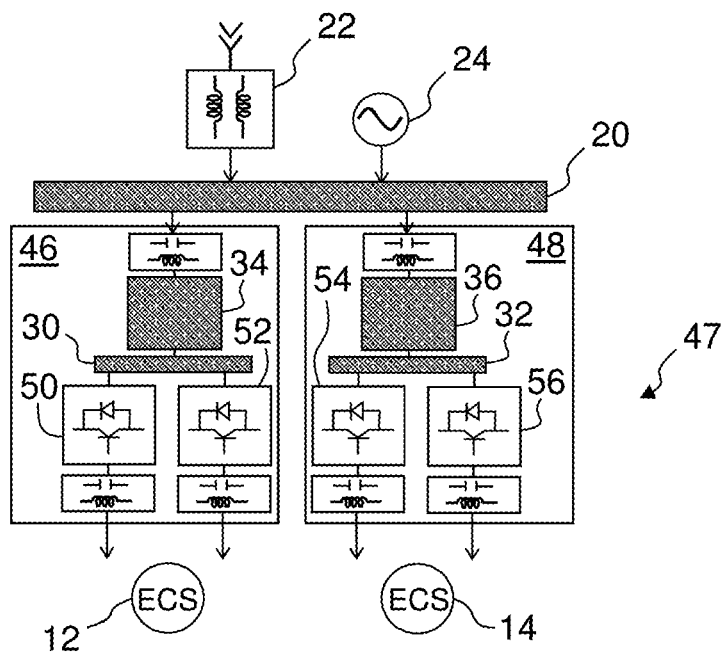
FIGS. 3 and 4 show a second embodiment of an electrical architecture of an aircraft.
Figure 4:
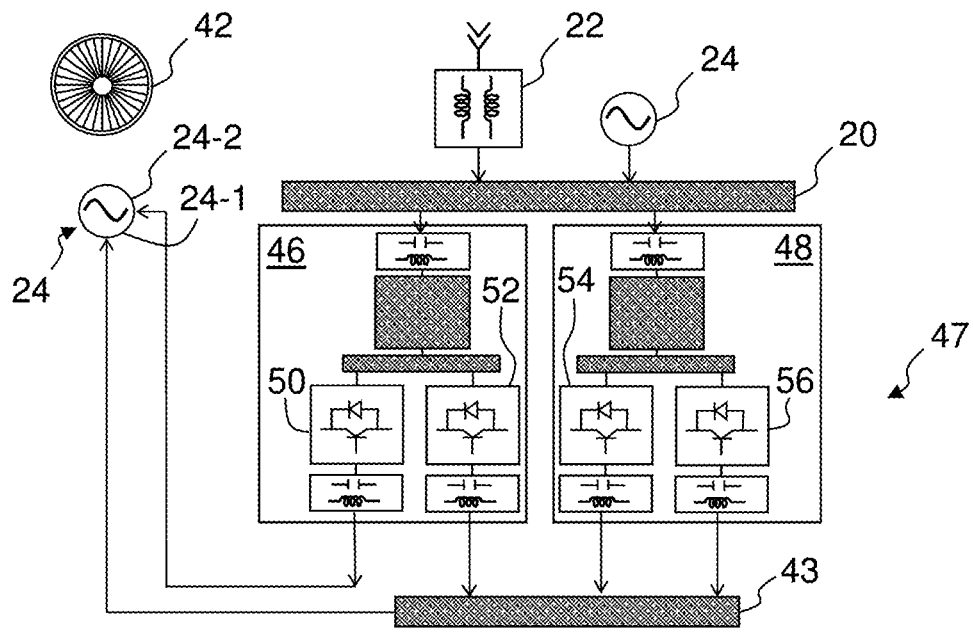

FIGS. 3 and 4 show a second embodiment of the invention in which the electrical architecture 47 also comprises two converters, with the reference numbers 46 and 48. The converter 46 contains the HVDC bus 30 and the rectifier 34 supplied by the HVAC bus 20. Equally, the converter 48 contains the HVDC bus 32 and the rectifier 36 supplied by the HVAC bus 20. In each one of the converters 46 and 48, the HVDC bus supplies two inverters, respectively 50 and 52 for the converter 46, and 54 and 56 for the converter 48. In contrast to the embodiment of FIGS. 1 and 2, in FIGS. 3 and 4 the two inverters of a given converter are identical. More specifically, they are intended to deliver the same nominal power.

In FIG. 3, as in FIG. 1, the converters 46 and 48 each supply one of the air-conditioning systems 12 and 14. For the converter 46, the two inverters 50 and 52 are coupled in order to supply the air-conditioning system 12. Equally, for the converter 48, the two inverters 54 and 56 are coupled in order to supply the air-conditioning system 14. The inverters may be coupled by means of a magnetic coupler arranged between the inverters and the associated air-conditioning system. Alternatively, it is possible to implement an air-conditioning system equipped with an electric machine having a number of phases that is equal to twice the number of phases of each inverter.

As for the embodiment of FIG. 1, at least one of the converters 46 and 48 may supply other loads of the aeroplane, such as the electric motor or motors for powering the wheels of the aeroplane.

In FIG. 4, as in FIG. 2, the converters 46 and 48 supply the electric machine 24. In the example shown, the inverters 52, 54 and 56 are coupled so as to supply the main winding 24-1. The exciter winding 24-2, for its part, requires only the power delivered by the inverter 50.

Figure 5:
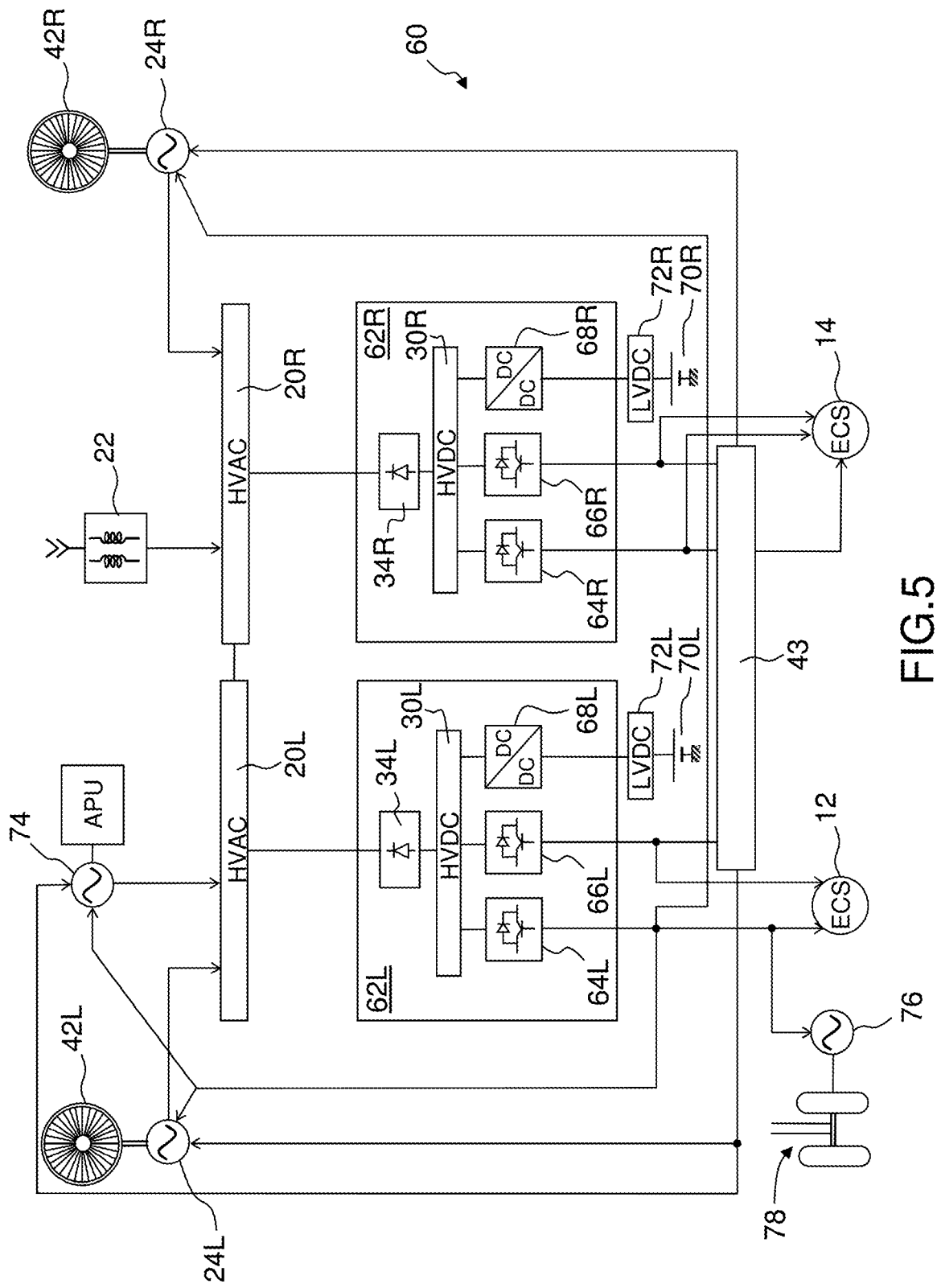
FIG. 5 shows, schematically, an electrical architecture of a twin-engine aircraft.

FIG. 5 shows, schematically, an exemplary electrical architecture 60 of a twin-engine aeroplane. The two main engines of the aeroplane have the references 42R for the right-hand engine and 42L for the left-hand engine. In general, an R or L suffix is used for the above-described references depending on their preferred association with the right- or left-hand engine. It is of course possible to extend this architecture to a three- or four-engine aeroplane.

There are two converters, here with references 62L and 62R. The converter 62L contains an HVDC bus 30L and a rectifier 34L supplied by an HVAC bus 20L. Equally, the converter 62R contains an HVDC bus 30R and a rectifier 34R supplied by an HVAC bus 20R. The HVAC buses 20L and 20R may be connected to form, together, the above-described HVAC bus 20. The connection between the two HVAC buses 20L and 20R may be permanent or controllable, in particular during use, such that it is possible to separate the HVAC buses 20L and 20R in the event of failure of a component associated with one of the buses and capable of propagating to all of the right-hand or left-hand equipment of the aeroplane.

As described above, the architecture 60 may be connected to a ground power unit when the aeroplane is on the ground. The connection is established via one of the HVAC buses 20L and 20R, possibly via the intermediary of the transformer or autotransformer 22. In FIG. 5, the transformer 22 is connected to the HVAC bus 20R. The connection can also be established at the HVAC bus 20L.

In each one of the converters 62L and 62R, the HVDC bus supplies two inverters, respectively 64L and 66L for the converter 62L, and 64R and 66R for the converter 62R. The two inverters of a given converter may be different, as in the embodiment of FIGS. 1 and 2, or identical, as in the embodiment of FIGS. 3 and 4. In addition, each of the converters 62L and 62R may comprise an elementary DC-DC converter, respectively 68L and 68R, which can charge or draw energy from a battery, respectively 70L and 70R, possibly via the intermediary of a low voltage direct current (LVDC) bus, respectively 72L and 72R.

Each main engine 42L and 42R is assigned an electric machine, respectively 24L and 24R, which can operate as a motor for starting up the associated main engine, and which can operate as a generator to supply the HVAC buses 20L or 20R.

The aeroplane may also be equipped with an auxiliary power unit (APU) and with an electric machine 74 for starting up the APU. As is the case for the electric machines 24L and 24R, the electric machine 74 may operate as a motor for starting up the APU, or as a generator once the APU has been started up in order to supply the electrical architecture 60, for example at one of the HVAC buses 20L or 20R. The electric machine 74 may alternatively be connected at another point in the architecture 60, for example at one of the HVDC buses 30L or 30R, or at one of the LVDC buses 72L or 72R.

FIG. 5 also shows the magnetic coupler 43 which serves to supply one or other of the electric machines 24L or 24R. Generally, the power required for starting up the APU is lower than that required for starting up the main engines 42L and 42R. It is possible to use just a single inverter to supply the electric machine 74 for starting up the APU. Alternatively, the coupler 43 may be used to couple together multiple inverters in order to supply the electric machine 74 if the power required for starting up the APU makes this necessary.

The architecture 60 also contains the air-conditioning systems 12 and 14 supplied respectively by the converters 62L and 62R.

In numerous aeroplanes equipped with two air-conditioning systems, it is possible for these to not both be used during flight. More specifically, it can be expedient to use just one of the two air-conditioning systems below a predetermined altitude. It is possible to use just one of the two converters 62L and 62R to supply the retained air-conditioning system. In this context, the other of the two converters is not used for air conditioning. Alternatively, it is advantageous to balance the use of the two converters 62L and 62R. It is then desirable to supply the retained air-conditioning system using the two converters coupled together. The coupling can be brought about by using a dedicated coupler or by reusing the coupler 43 which is no longer used once the main engines 42L and 42R have been started up.

In order to move on the ground, in particular from a parking spot to the runway, between two parking spots or from the runway to a parking spot, the aeroplane generally uses its main engines: fuel-powered turbofans or turboprops. These engines generate pollution and unpleasant levels of noise. For movement on the ground, it is possible to equip the landing gear of the aeroplane with electric motors that can power its wheels so as to allow the aeroplane to move. FIG. 5 shows an electric machine 76 powering landing gear 78. The electric machine 76 is in this case supplied by the inverter 64L. It is of course possible to supply the electric machine 76 using multiple inverters. Moreover, the electric machine 76 can be used as a generator, for example in order to brake the wheels of the landing gear 78. In that case, the inverter or inverters to which the electric machine 76 is connected are reversible so as to supply or recover energy depending on the operating mode of the electric machine 76, either as a motor or as a generator.

In FIG. 5, various equipment can be connected to the converters 62L and 62R. Other equipment on board the aeroplane can also be capable of being connected to the converters 62L and 62R. This equipment is not all permanently connected to the converters 62L and 62R. Contactors, which are not shown in the figures, serve to connect one or more items of equipment. The connection of the various items of equipment varies over time during the mission of the aeroplane. For example, during taxiing, it is possible to interrupt the supply to at least one of the air-conditioning systems, in this case the air-conditioning system 12, in order to supply the one or more electric motors for powering the wheels of the aeroplane.

Figure 6:
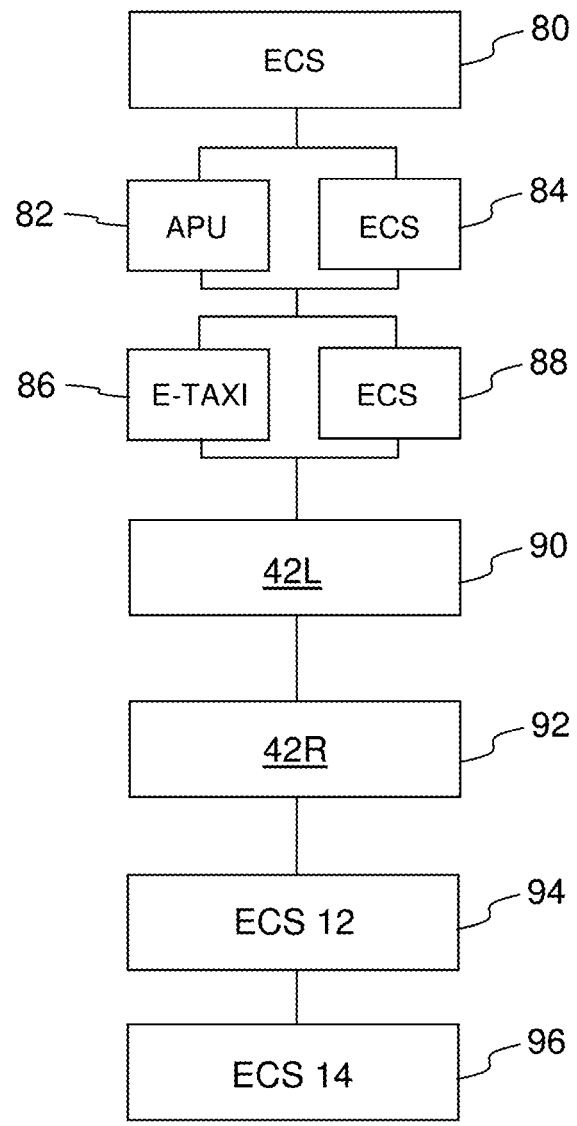
FIG. 6 shows an exemplary method using the architecture of FIG. 5.

FIG. 6 shows an exemplary method employing the architecture of FIG. 5, in which method various phases of the mission of an aeroplane may succeed one another.

When the aeroplane is immobile at its parking spot, it is generally supplied by a ground power unit and the HVAC networks 20L and 20R receive energy via the transformer 22. In a first step 80, at least one of the air-conditioning systems 12 or 14 is supplied. Air-conditioning is useful in particular while boarding passengers onto the aeroplane.

Once boarding is finished, the aeroplane must be able to leave its parking spot. The ground power unit is then disconnected and, in a step 82, the auxiliary power unit APU is started up. Starting-up of the APU can be done by taking energy from the ground power unit prior to its disconnection, or from the batteries 70L and/or 70R. Starting-up of the APU can require just one of the two converters 62R or 62L. In this case, it is possible to maintain the supply to one of the air-conditioning units 12 or 14. The supply for the air-conditioning unit 14 is illustrated by a step 84. Alternatively, during step 82, it is possible to interrupt the supply to one or both of the air-conditioning units 12 and 14. Starting-up of the APU can typically take of the order of one minute. During this time lapse, the inertia of the cabin is sufficient for the deterioration in passenger comfort to remain acceptable.

After starting-up of the APU, the aeroplane must be able to taxi to the runway. In recent aeroplanes, this taxiing can be done by means of the one or more electric machines 76 powering the landing gear 78. The one or more electric machines 76 is/are powered in step 86. The one or more electric machines 76 may use just one of the two converters 62L or 62R. The other converter may be used to supply one of the air-conditioning systems 12 or 14. Supplying one of the air-conditioning systems while supplying the one or more electric machines 76 is shown by a step 88 in FIG. 5. Alternatively, if the one or more electric machines 76 require both converters 62L and 62R in order to operate, it is possible to suspend operation of the two air-conditioning systems 12 and 14. Step 88 is then omitted.

The main engines 42L and 42R are started up in succession prior to takeoff. More precisely, the electric machine 24L, operating as a motor, starts up the main engine 42L. This start-up is represented by a step 90 in FIG. 6. After start-up, the main engine 42L may drive the electric machine 24L which then operates as a generator and then supplies the two converters 62L and 62R.

Then, the electric machine 24R, operating as a motor, starts up the main engine 42R, which is depicted in FIG. 5 by a step 92. As before, after start-up, the main engine 42R may drive the electric machine 24R which then operates as a generator and supplies the two converters 62L and 62R.

It is conventional, in twin-engine aeroplanes, for the left-hand main engine to be started up before the right-hand main engine. The location on the left or on the right of the aeroplane is purely a matter of convention. It is of course possible, without departing from the scope of the invention, to start up the right-hand main engine before the left-hand main engine.

In steps 90 and 92, the two converters 62L and 62R are used to start up the two main engines 42L and 42R in succession. During steps 90 and 92, the air-conditioning systems 12 and 14 are no longer supplied. After start-up of the two main engines 42L and 42R, the supply to the air-conditioning systems 12 and 14 is resumed.

It is possible to dissociate the supply to the two air-conditioning systems 12 and 14. Only one of the two systems, for example the air-conditioning system 12, is supplied during a step 94. As mentioned above, the coupler 43 may be used so that the two converters 62L and 62R together supply the air-conditioning system 12. Then, when the aeroplane reaches a predetermined altitude during a step 96, both air-conditioning systems 12 and 14 are supplied, each by one of the converters 62L and 62R.

Figure 7B:
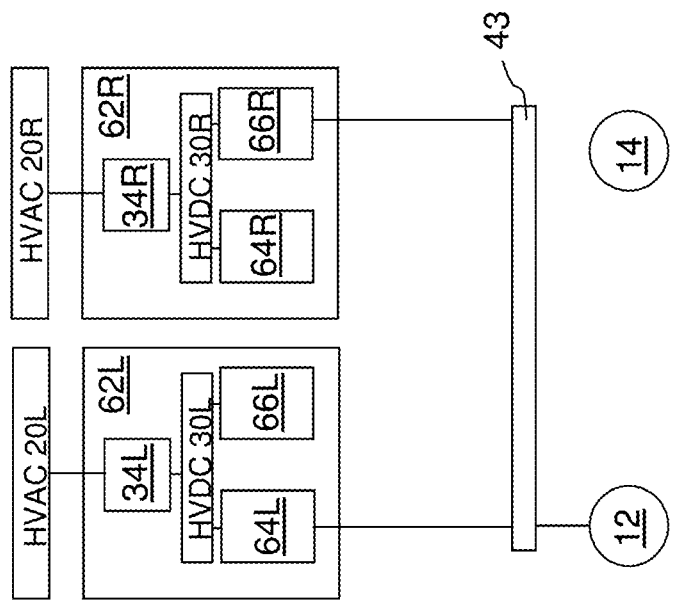
FIGS. 7a and 7b show two variants by which it is possible to supply an air-conditioning system of the aircraft.
Figure 7A:
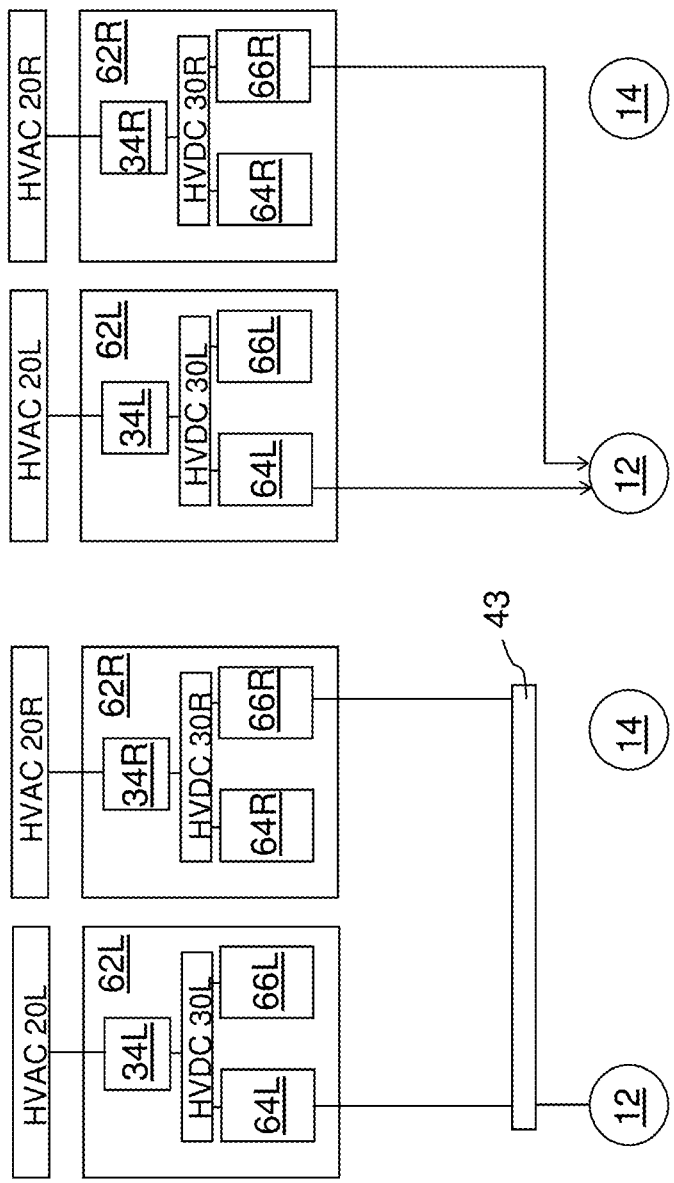

FIGS. 7a and 7b depict two variants by means of which it is possible to supply one of the air-conditioning systems, for example the system 12, while the air-conditioning system 14 is not supplied. Supplying just one of the air-conditioning systems can take place in steps 84, 88 and 94. In FIG. 7a, the air-conditioning system 12 is supplied by the inverters 64L and 66R by means of the magnetic coupler 43. The use of a magnetic coupler is advantageous when the number of phases of the inverters 64L and 66R is the same as the number of phases of the electric machine of the air-conditioning system 12, in particular the electric machine driving a compressor. It is conventional to implement a three-phase electric machine which then operates with inverters that are also three-phase. In FIG. 7a, an inverter of each one of the converters 62L and 62R is used for supplying the air-conditioning system 12. This makes it possible to balance the HVAC networks 20L and 20R. Alternatively, when there is no need to balance the HVAC networks 20L and 20R, or when the inverters that are not used for the air-conditioning system 12 are used for other loads which provide balancing, it is possible to supply the air-conditioning system 12 using two inverters of a given converter.

In FIG. 7b, the two inverters 64L and 66R directly supply the air-conditioning system 12 with no magnetic coupler. This variant is advantageous when the number of phases of the electric machine of the air-conditioning system 12 is double the number of phases of the inverters 64L and 66R. For example, the inverters may be three-phase and the electric machine of the air-conditioning system 12 may then be six-phase, which makes it possible to dispense with a coupler.

The two variants of FIGS. 7a and 7b implement the converters 62L and 62R depicted in FIGS. 3 and 4. It is also possible to implement these two variants using the converters 16 and 18 depicted in FIGS. 1 and 2.

Furthermore, in both variants of FIGS. 7a and 7b, it is possible to use those inverters which are not used to supply the air-conditioning system 12 in order to supply other loads of the aircraft.

Figure 8:
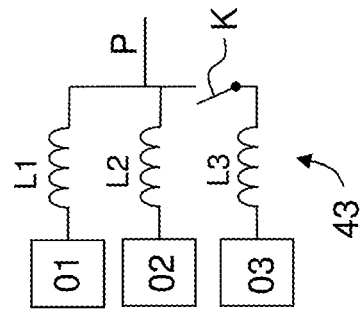
FIG. 8 shows an example of a magnetic coupler.

FIG. 8 shows an example of a magnetic coupler 43 that is suitable for coupling multiple inverters and more specifically a phase of each inverter. The coupler of FIG. 8 is duplicated for each one of the phases when the inverters are polyphase.

In series with a phase of each inverter, here labelled O1, O2 and O3, there is connected an inductor. FIG. 8 shows three inductors L1, L2 and L3. The number of inductors is to be adapted depending on the number of inverters that are to be coupled. The terminals of the inductors L1, L2 and L3 that are not connected to the inverters O1, O2 and O3 are connected to one another to form a coupler output phase P that is intended to supply an electric machine, such as that of the air-conditioning system 12 or the main winding 24-1. One or more contactors K serve to temporarily connect the inductors L1, L2 and L3 to one another depending on the requirements of the load supplied by the coupler 43. FIG. 8 shows a switch K. Any combination of switches may be implemented in order to provide the desired coupling.

Figure 9:
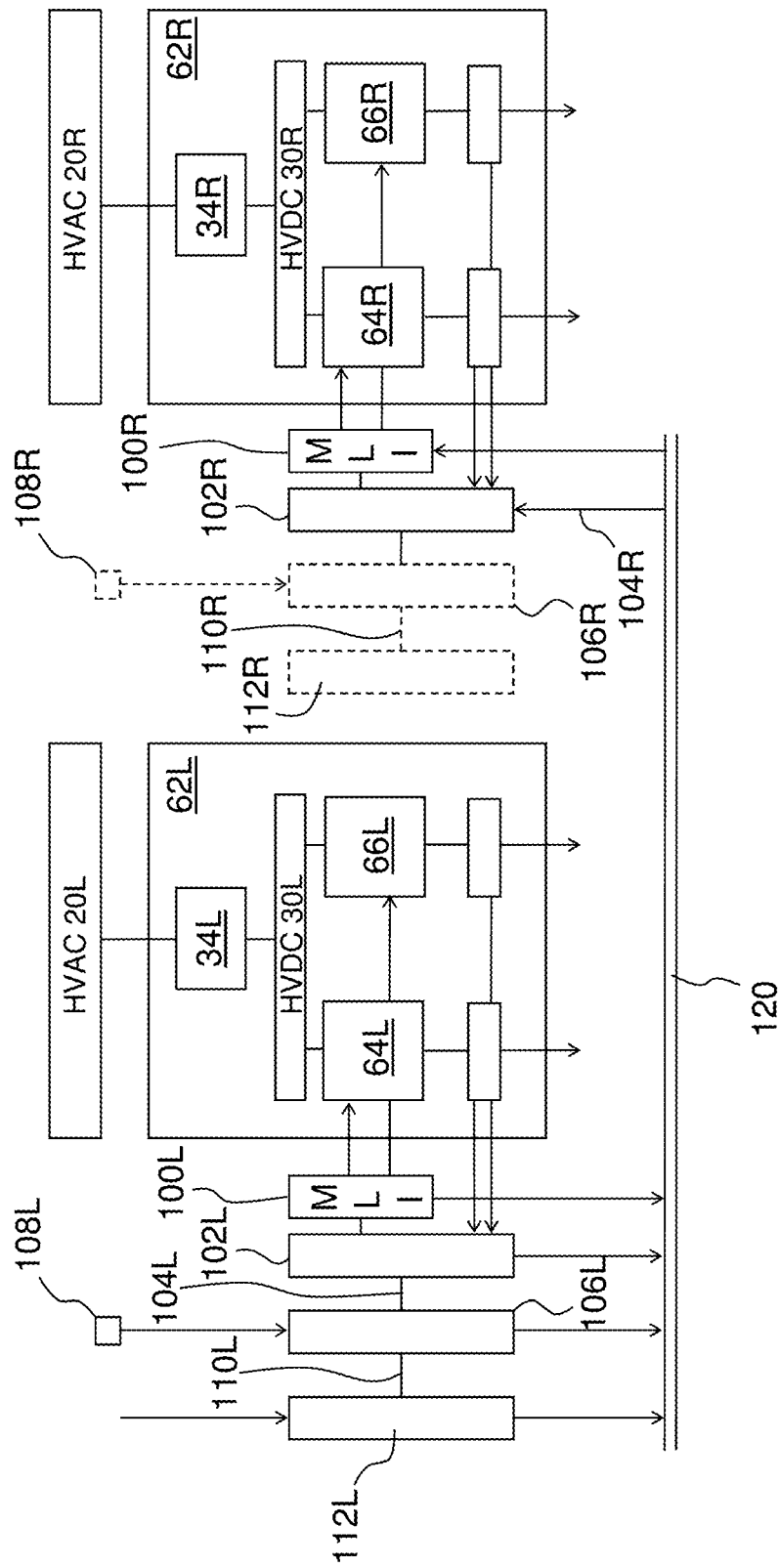
FIG. 9 shows the driving of converters of the electrical architecture.

FIG. 9 illustrates the driving of converters. This driving can be implemented in the various embodiments of the electrical architecture. As previously, the driving is illustrated in relation to the converters 62L and 62R which are shown in FIGS. 3 and 4. It is also possible to implement this driving for the converters 16 and 18 depicted in FIGS. 1 and 2.

Associated with each converter 62L and 62R and more specifically with each inverter, a pulse width modulator PWM delivers binary orders for opening and closing electronic switches of each one of the inverters. A PWM modulator 100L is associated with the converter 62L and drives the inverters 64L and 66L. A PWM modulator 100R is associated with the converter 62R and drives the inverters 64R and 66R. Each converter may comprise a close control (not shown) that is directly connected to the gates of electronic switches belonging to the various inverters. The close controls generate suitable signals for the switches on the basis of the binary orders delivered by the modulators 100L and 100R.

Upstream of each of the pulse width modulators 100L and 100R, the electrical architecture comprises a current feedback module for the inverter, respectively 102L and 102R. A current sensor measures the output current from each inverter and sends this measurement to the respective module 102L or 102R. The current sensor may be located at a filtering element arranged in the converter, downstream of the corresponding inverter. The current sensor may carry out its measurement on one of the phases or simultaneously on the various phases of the corresponding inverter. The module 102L or 102R and the one or more associated current sensors form a feedback loop, referred to as the current loop, receiving a current setpoint, respectively 104L or 104R. Each module 102L or 102R delivers a duty cycle to each one of the PWM modulators in order that the current delivered by the corresponding inverter follows the current setpoint 104L and 104R.

Upstream of each one of the modules 102L and 102R, the architecture comprises a feedback module for the operation of the loads supplied by the inverters. In FIG. 9, these modules respectively have the references 106L and 106R. Associated with each module 106L and 106R, one or more operation sensors measures a parameter that is characteristic of the operation of the load supplied by each one of the inverters. This may be, for example, the rotational speed of a motor or the torque that it delivers. In FIG. 9, the operation sensors respectively have the references 108L and 108R. Each load that can be supplied by an inverter has its own operation sensor, and the connection of the modules 106L and 106R to the associated sensors varies depending on the load supplied by the inverter.

The module 106L or 106R and its associated sensor 108L and 108R form a feedback loop, referred to as the load loop, receiving an operation setpoint for the load 110L or 110R. The load loop modifies the current setpoint 104R or 104L such that the parameter that is characteristic of the operation of the load 12 follows the setpoint 110L or 110R for operation of the load.

Upstream of each module 106L and 106R, the architecture may comprise a mode selection module, respectively 112L and 112R. This module receives a high-level setpoint defining the operation of the load. For example, for the electric machine 24 associated with a main engine, the setpoint can define whether the electric machine 24 operates as a generator in order to supply the HVAC networks or as a motor serving to start up the associated main engine. In generator mode, the high-level setpoint may for example define the voltage that the generator has to supply.

This setpoint may originate from a main engine management system that interfaces between the cockpit of the aircraft and the main engine. The management system is often referred to as FADEC (for "Full Authority Digital Engine Control"). The engine management system manages, in particular, the injection of fuel into the turbine of the engine depending on the power requirement set by the pilot via the flight controls. The setpoint may equally originate from a system for managing the electric generators of the aircraft, referred to as GCU (for "Generator Control Unit").

In FIG. 9, the modules 106L and 112L are depicted in solid lines and the modules 106R and 112R are represented in dashed lines. Moreover, FIG. 9 shows a bus 120 on which are connected the various modules 100L, 100R, 102L, 102R, 106L, 106R, 112L and 112R. The depiction in dashed lines of the modules 106R and 112R illustrates the fact that the two converters 62L and 62R together supply a given load, for example the electric machine 24L or the air-conditioning system 12.

In this mode of operation, only the sensor or sensors 108L associated with the supplied load provide a measurement which is sent only to the operation feedback module 106L.

The current setpoint 104L is delivered by the module 106L. The module 106R, for its part, is inactive. The current setpoint 104R is also generated by the module 106L and is sent to the module 102 via the bus 120.

The PWM modulator 100L may also send information to the PWM modulator 100R, in particular a synchronization in order that the associated inverters can more easily be coupled.

Starting-up of the two engines 42L and 42R is done sequentially in steps 94 and 96. It would be possible to mutualize the modules 106R and 106L so as to have just one module in the electrical architecture of the aircraft. However, it is advantageous to avoid crossovers between the left-hand and right-hand equipment of the aircraft. Thus, each converter has its modules 106R or L and 112R or L. During supply of the electric machine 24R, the modules 106R and 110R are active and send their setpoint and their synchronization via the bus 120 to the current feedback module 102L and to the PWM modulator 100L.

In order to drive the converters, the proposed division into various modules is provided only by way of example. Other divisions or feedback loops may emerge. The functional distinction between the various modules associated with each one of the converters may vary without departing from the scope of the invention.

More generally, when supplying a left-hand load of the aircraft, in particular the left-hand main engine 42L or the left-hand air-conditioning system 12, the left-hand converter 62L and its driving means operate as a master. The right-hand converter 62R and its driving means operate as a slave when contributing to the supply to the left-hand load. Conversely, when supplying a right-hand load of the aircraft, the right-hand converter 62R and its driving means operate as a master while the left-hand converter 62L and its driving means operate as a slave when contributing to the supply to the right-hand load.

The invention claimed is:

1. An electrical architecture for an aircraft comprising:
   two air-conditioning systems, two converters, each intended to supply one of the air-conditioning systems, and at least one first electric machine which starts up a first main engine of the aircraft, wherein the electrical architecture is configured such that the two converters can together supply the at least one first electric machine, wherein each of the two converters comprises two inverters, wherein the electrical architecture further comprises a coupler which serves to link at least one of the two inverters of each of the two converters, and wherein the at least one first electric machine comprises a main winding that can be supplied by the coupler and an exciter winding that can be supplied by the other one of the two inverters of each of the two converters;
   a second electric machine that starts up a second main engine of the aircraft, wherein the electrical architecture is configured such that the two converters can together supply the first electric machine or the second electric machine; and
   a first driver module associated with a first one of the two converters, a second driver module associated with a second one of the two converters and a bus that allows the first and second driver modules to communicate, wherein the electrical architecture is configured so as to make the first converter and the first driver module masters during combined supply of the first electric machine, the second converter and the second driver module being slaves, and wherein the electrical architecture is configured so as to make the second converter and the second driver module masters during combined supply of the second electric machine, the first converter and the first driver module being slaves.

2. The electrical architecture according to claim 1, wherein when the aircraft is below a predetermined altitude, the two converters are configured to supply just one of the two air-conditioning systems.

3. The electrical architecture according to claim 1, wherein an inverter of each converter supplies an air recirculation fan.

4. The electrical architecture according to claim 1, wherein an inverter of at least one of the converters supplies an electric motor for powering a wheel of the aircraft.

5. The electrical architecture according to claim 1, further comprising an auxiliary power unit and an electric machine for starting up the auxiliary power unit, wherein the electrical architecture is configured such that the two converters can supply the electric machine for starting up the auxiliary power unit.

6. The electrical architecture according to claim 5, further comprising at least one battery for storing electrical energy, wherein the electric machine for starting up the auxiliary power unit is supplied by the battery via the converters.

7. An aircraft comprising an electrical architecture for an aircraft comprising:
   two air-conditioning systems, two converters, each intended to supply one of the air-conditioning systems, and at least one first electric machine which starts up a first main engine of the aircraft, wherein the electrical architecture is configured such that the two converters can together supply the at least one first electric machine, wherein each of the two converters comprises two inverters, wherein the electrical architecture further comprises a coupler which serves to link at least one of the two inverters of each of the two converters, and wherein the at least one first electric machine comprises a main winding that can be supplied by the coupler and an exciter winding that can be supplied by the other one of the two inverters of each of the two converters;
   a second electric machine that starts up a second main engine of the aircraft, wherein the electrical architecture is configured such that the two converters can together supply the first electric machine or the second electric machine; and
   a first driver module associated with a first one of the two converters, a second driver module associated with a second one of the two converters and a bus that allows the first and second driver modules to communicate, wherein the electrical architecture is configured so as to make the first converter and the first driver module masters during combined supply of the first electric machine, the second converter and the second driver module being slaves, and wherein the electrical architecture is configured so as to make the second converter and the second driver module masters during combined supply of the second electric machine, the first converter and the first driver module being slaves.

8. A method for operating an electrical architecture according to claim 1, wherein the first and second electric machines are configured so as to permit operation as a motor or as a generator, making it possible to supply the two converters, the method consisting in supplying the first electric machine operating as a motor so as to start up the first main engine until the first electric machine operates as a generator, receiving mechanical energy from the first main engine, the first electric machine then supplying the two converters, the method further consisting in supplying the second electric machine operating as a motor in order to start up the second main engine.

9. The method according to claim 8, wherein the at least one first electric machine for starting up an auxiliary power unit is configured so as to permit operation as a motor or as a generator, making it possible to supply the two converters the method consisting in supplying the at least one first electric machine for starting up the auxiliary power unit operating as a motor in order to start up the auxiliary power unit from a battery until the at least one first electric machine for starting up the auxiliary power unit, receiving mechanical energy from the auxiliary power unit, operates as a generator to supply the two converters, the method then consisting in supplying the first electric machine operating as a motor in order to start up the first main engine.

10. The method according to claim 9, consisting in supplying an electric motor for powering a wheel of the aircraft once the auxiliary power unit has been started up and before starting up of the first main engine by the first electric machine.

\* \* \* \* \*